(12) United States Patent
Hara et al.

(10) Patent No.: US 7,726,820 B2
(45) Date of Patent: Jun. 1, 2010

(54) PROJECTION TYPE DISPLAY UNIT HAVING A CURVED HOUSING

(75) Inventors: Nobuyuki Hara, Kanagawa (JP); Shinichi Ueda, Aichi (JP); Makoto Nagata, Shizuoka (JP); Yoshihisa Wada, Shizuoka (JP); Dai Yoneya, Tokyo (JP); Osamu Onodera, Kanagawa (JP)

(73) Assignee: Sony Corporation, Tokyo (JP)

( * ) Notice: Subject to any disclaimer, the term of this patent is extended or adjusted under 35 U.S.C. 154(b) by 562 days.

(21) Appl. No.: 11/440,004

(22) Filed: May 25, 2006

(65) Prior Publication Data

US 2007/0070298 A1    Mar. 29, 2007

(30) Foreign Application Priority Data

May 26, 2005   (JP) ............................ P2005-154149
Sep. 8, 2005   (JP) ............................ P2005-261242

(51) Int. Cl.
G03B 21/14 (2006.01)
G03B 21/22 (2006.01)
H04N 5/64 (2006.01)
G03B 21/18 (2006.01)
G03B 21/26 (2006.01)

(52) U.S. Cl. ................. 353/119; 348/836; 348/838; 353/56; 353/57

(58) Field of Classification Search ............... 353/119, 353/22, 122, 56–57; 348/787–788, 836, 348/838, 794
See application file for complete search history.

(56) References Cited

U.S. PATENT DOCUMENTS 6,637,895 B2 * 10/2003 Fujimori et al. ............ 353/119

| | | | |
|---|---|---|---|
| 6,882,480 B2 * | 4/2005 | Yanagisawa | 359/634 |
| 7,195,388 B2 * | 3/2007 | Hori | 362/583 |
| 7,540,618 B2 * | 6/2009 | Kim et al. | 353/119 |
| 2002/0163627 A1 * | 11/2002 | Ohishi et al. | 353/58 |
| 2003/0081185 A1 * | 5/2003 | Nakano et al. | 353/97 |
| 2005/0024596 A1 * | 2/2005 | Kuroda et al. | 353/34 |
| 2005/0237499 A1 * | 10/2005 | Oross et al. | 353/119 |
| 2005/0243285 A1 * | 11/2005 | Yamada et al. | 353/52 |
| 2005/0254021 A1 * | 11/2005 | Lee et al. | 353/119 |
| 2006/0132728 A1 * | 6/2006 | Kim et al. | 353/119 |

FOREIGN PATENT DOCUMENTS

JP         3047152         3/2000

(Continued)

*Primary Examiner*—Georgia Y Epps
*Assistant Examiner*—Jori S Byrne-Diakun
(74) *Attorney, Agent, or Firm*—Finnegan, Henderson, Farabow, Garrett & Dunner, LLP

(57) ABSTRACT

A cabinet of a projection type display unit includes a base cabinet on which main component parts are mounted, and a top cover made from sheet metal which is mounted so as to cover the base cabinet, wherein a rear face portion of the top cover is formed in the shape of a curved surface being laid-down U-shaped in side view. The U-shaped curved surface is formed on an ergonomic basis, so that the rear face portion can be gripped securely even with one hand. On the back side of the top cover, bosses are integrally formed by use of a resin which is a different material from the sheet metal of the top cover, and the base cabinet and the top cover are fixed by fastening screws to the bosses from the base cabinet side.

9 Claims, 14 Drawing Sheets

FOREIGN PATENT DOCUMENTS

| | | |
|---|---|---|
| JP | 2003-043583 | 2/2003 |
| JP | 2003-241310 | 8/2003 |
| JP | 2003-241314 | 8/2003 |
| JP | 2004-240024 | 8/2004 |
| JP | 2004-264608 * | 9/2004 |
| JP | 2005-084221 | 3/2005 |

* cited by examiner

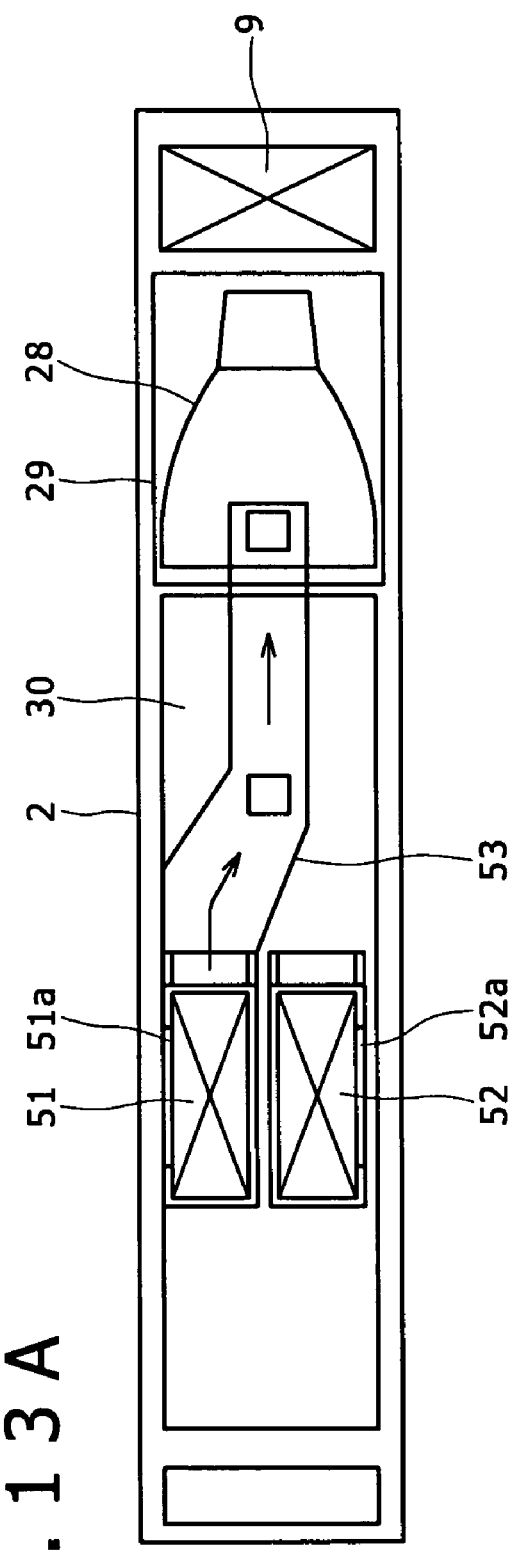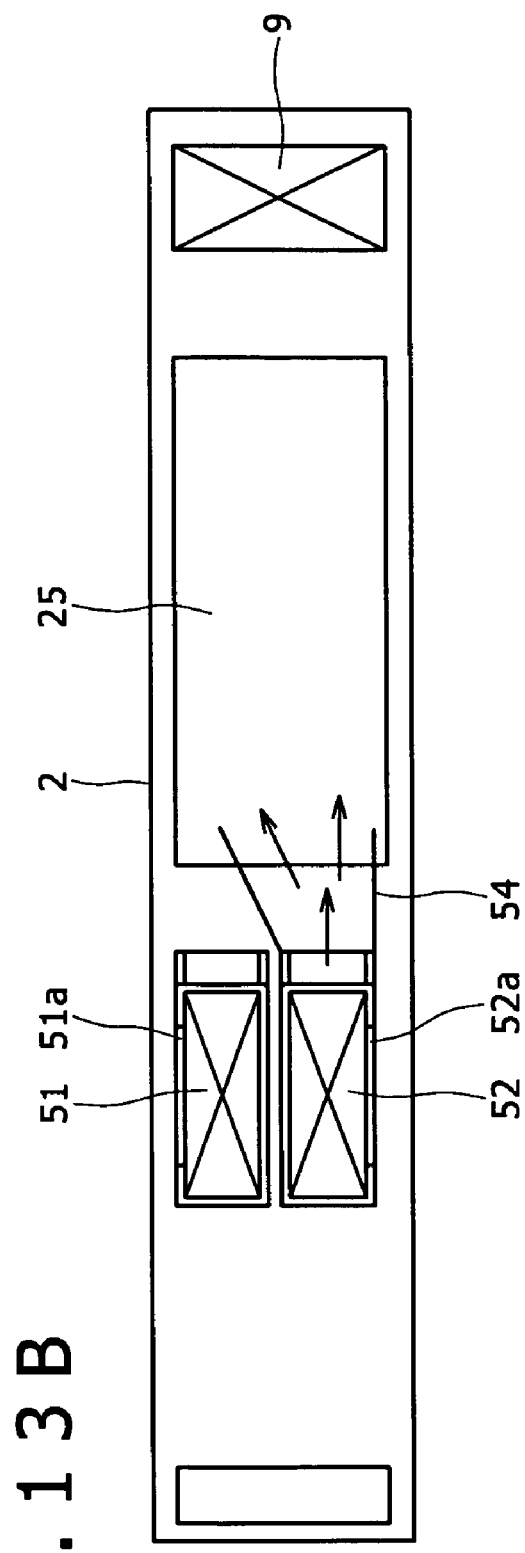

PROJECTION TYPE DISPLAY UNIT HAVING A CURVED HOUSING

CROSS REFERENCES TO RELATED APPLICATIONS

The present invention contains subject matter related to Japanese Patent Application JP 2005-154149 filed in the Japanese Patent Office on May 26, 2005, and Japanese Patent Application JP 2005-261242 filed in the Japanese Patent Office on Sep. 8, 2005 the entire contents of which being incorporated herein by reference.

BACKGROUND OF THE INVENTION

The present invention relates to a projection type display unit such that an image obtained by irradiating a light valve, or valves, with light from a light source is projected onto a screen, or the like, for displaying the image, particularly to a heat release structure for a projecting type display unit.

A projection type display unit, generally called a video projector, has a configuration in which a light source, an optical unit including light valves, and a projection lens, and a cooling section for cooling the light source and the optical unit are incorporated in an armor cabinet (see, for example, Japanese Patent Laid-open No. 2003-241314).

The projection type display unit is a unit in which an image obtained by irradiating the light valves in the optical unit with light emitted from a lamp serving as the light source is projected onto a screen by the projection lens, thereby displaying the image.

SUMMARY OF THE INVENTION

Such projection type display units have come to be frequently used also for electronic presentation attendant on the spread of PCs (personal computers). Among these display units, a projection type display unit excellent in portability as an image output device for a notebook type PC or the like, particularly, has come to be keenly requested.

Considering the projection type display units in related art from this point of view, they are not structured taking portability into particular account, so that in moving such a projection type display unit in related art, it is a general practice to carry the display unit by gripping appropriate portions of the armor cabinet with both hands.

Thus, the projection type display unit in related art has been very troublesome to carry because it is necessary to carry the display unit by gripping it with both hands. In addition, where it is intended to carry the display unit by gripping it with one hand irrationally, the display unit is difficult to grip because the armor cabinet is large in thickness. Besides, since the armor cabinet is generally angular in shape, the gripping depth to fingertips in gripping the armor cabinet is so small that the state of being gripped by one hand is instable, so that the display unit cannot be carried with assurance.

The present invention has been made in consideration of the above-mentioned points. Accordingly, it is desirable to provide a projection type display unit which is of a thin type and excellent in portability so that it can be carried in a stable state even when gripped with one hand.

According to an embodiment of the present invention, there is provided a projection type display unit including a light source, an optical unit including a light valve and a projection lens, and a cooling section for cooling the light source and the optical unit, the light source and the optical unit as well as the cooling section being incorporated in an armor cabinet, wherein the armor cabinet includes a base cabinet on which the light source, the optical unit and the cooling section are mounted, and a top cover composed of a sheet metal and so mounted as to cover the base cabinet; the base cabinet is provided on the front side thereof with an opening for the projection lens; and a rear face portion composed of the top cover on the opposite side of the opening for the projection lens is formed in the shape of a laid-down U-shaped curved surface.

According to another embodiment of the present invention, there is provided a projection type display unit including a light source, an optical unit including a light valve and a projection lens, and a cooling section for cooling the light source and the optical unit, the light source and the optical unit as well as the cooling section being incorporated in an armor cabinet, wherein the armor cabinet includes a base cabinet on which the light source, the optical unit and the cooling section are mounted, and a top cover composed of a sheet metal and so mounted as to cover the base cabinet; a resin-made boss is projectingly provided on the back side of the top cover; and a screw is fastened to the boss from the base cabinet side to thereby fix the base cabinet and the top cover.

In the projection type display unit according to the present invention configured as above, the top cover composed of the sheet metal is adopted to constitute a part of the armor cabinet, whereby the armor cabinet can be reduced in thickness, a great effect on thinning the display unit can be obtained, and the display unit is made to be advantageous to carry.

Besides, in the present invention, the rear face portion composed of the top cover is formed in the shape of a U-shaped curved surface, whereby the portion can be ergonomically fitted to a palm when gripped by hand, and it becomes possible to grip the portion deeply to fingertips, and to securely grip the portion even by one hand. Thus, a projection type display unit excellent in portability can be provided.

In addition, the top cover in the projection type display unit has the resin-made bosses on the back side thereof, and the screws are fastened to the bosses from the base cabinet side to thereby fix the base cabinet and the top cover. Therefore, there are no projecting parts on the surface of the top cover, so that carrying of the display unit would not be hampered by such projecting parts, which is much advantageous for enhancing the portability of the display unit. Furthermore, the absence of projecting parts on the surface of the top cover makes it possible to adopt any of a diversity of designs, and to enhance the degree of freedom in designing.

Besides, in the projection type display unit of the present invention, the bosses on the back side of the top cover are made of a resin which is different from the sheet metal, so that there is no possibility that cutting chips generated from the bosses at the time of fastening the screws into the bosses might adversely affect a power circuit or the like inside the display unit.

The above and other objects, features and advantages of the present invention will become apparent from the following description and appended claims, taken in conjunction with the accompanying drawings.

BRIEF DESCRIPTION OF THE DRAWINGS

FIGS. 13A and 13B are schematic diagrams showing a cooling structure of the projection type display unit according to the embodiment;

DETAILED DESCRIPTION OF THE PREFERRED EMBODIMENTS

Figure 1:
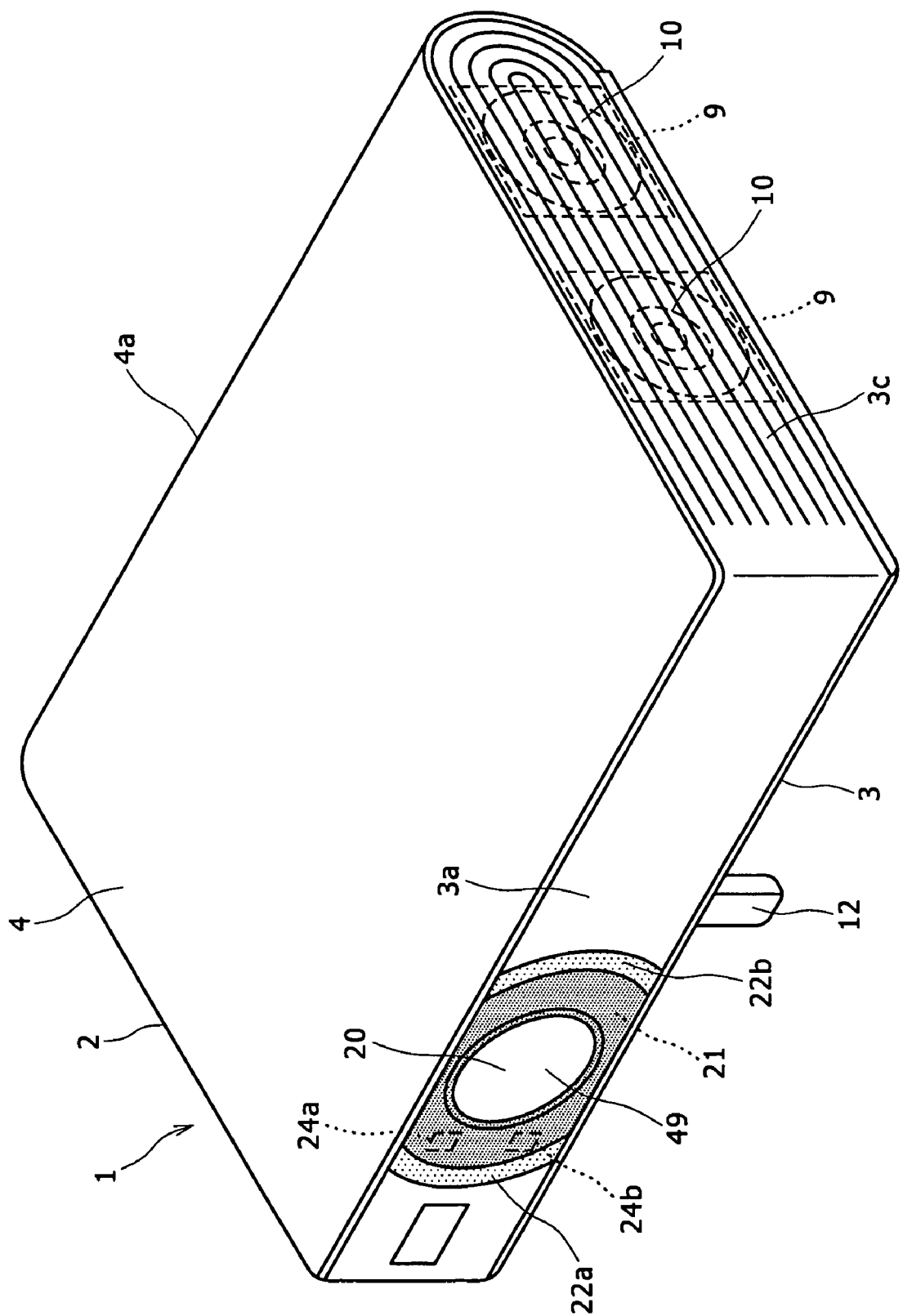
FIG. 1 is a perspective view of a projection type display unit according to an embodiment of the present invention.
Figure 2:
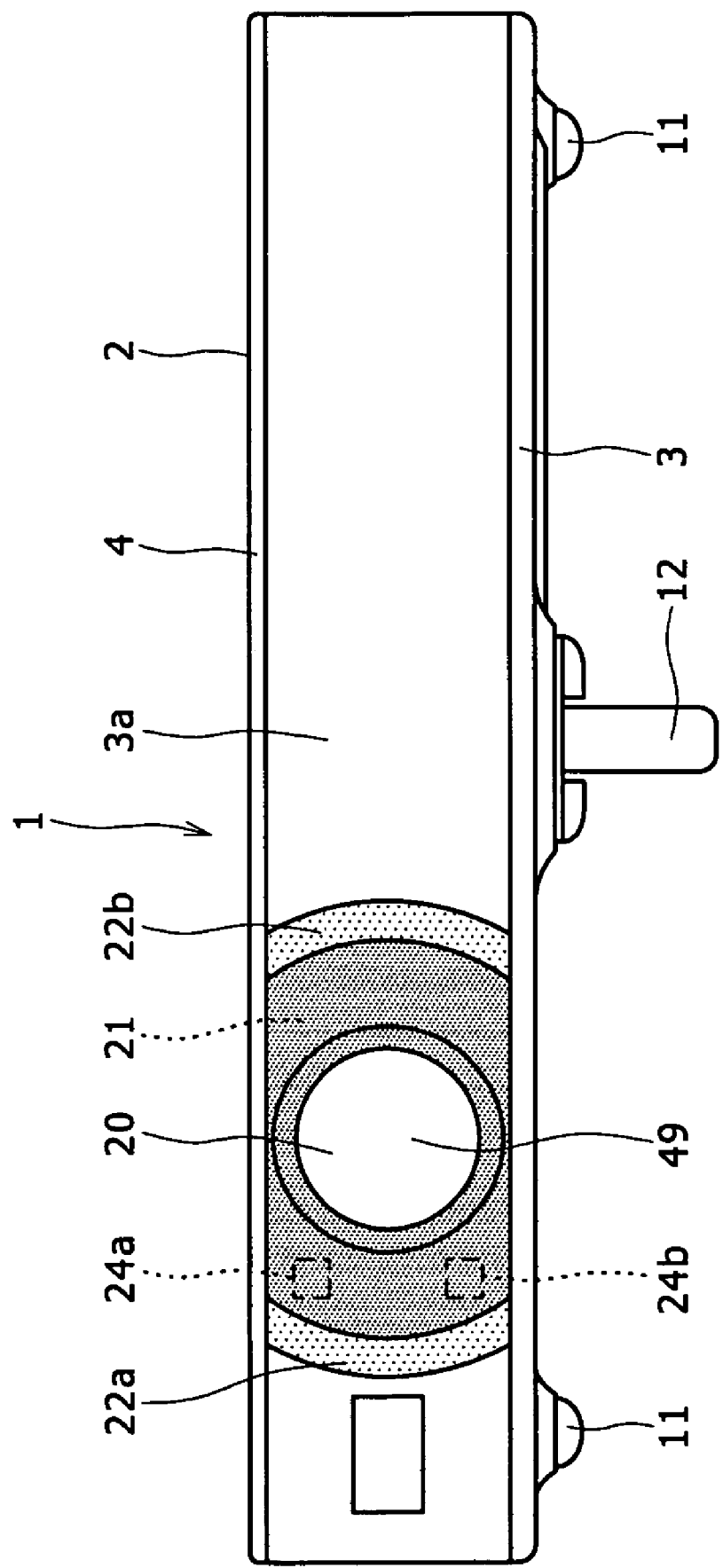
FIG. 2 is a front view of the projection type display unit according to the embodiment.
Figure 3:
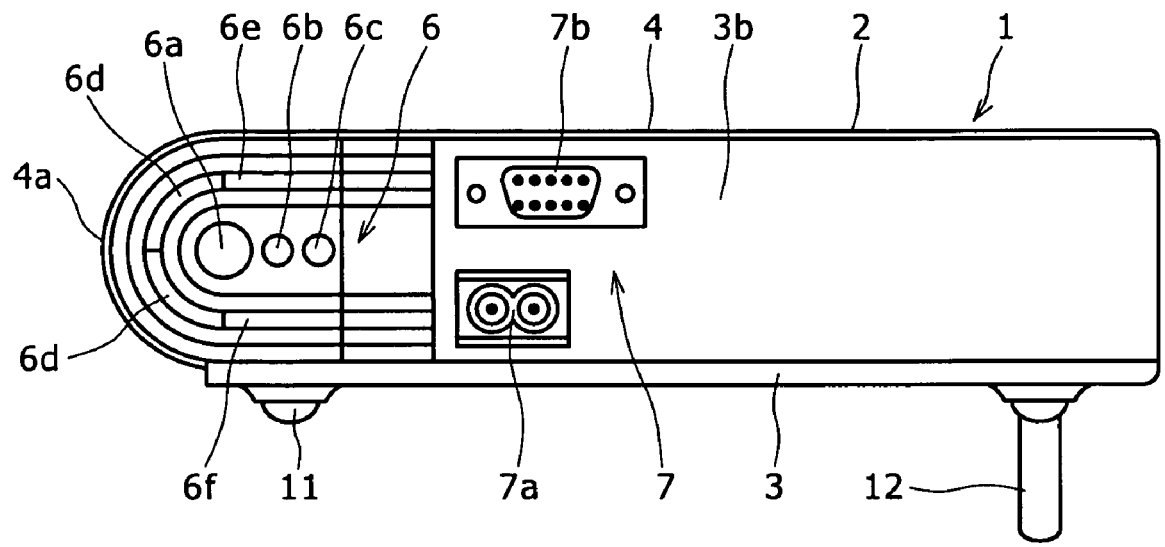
FIG. 3 is a left side view of the projection type display unit according to the embodiment.
Figure 4:
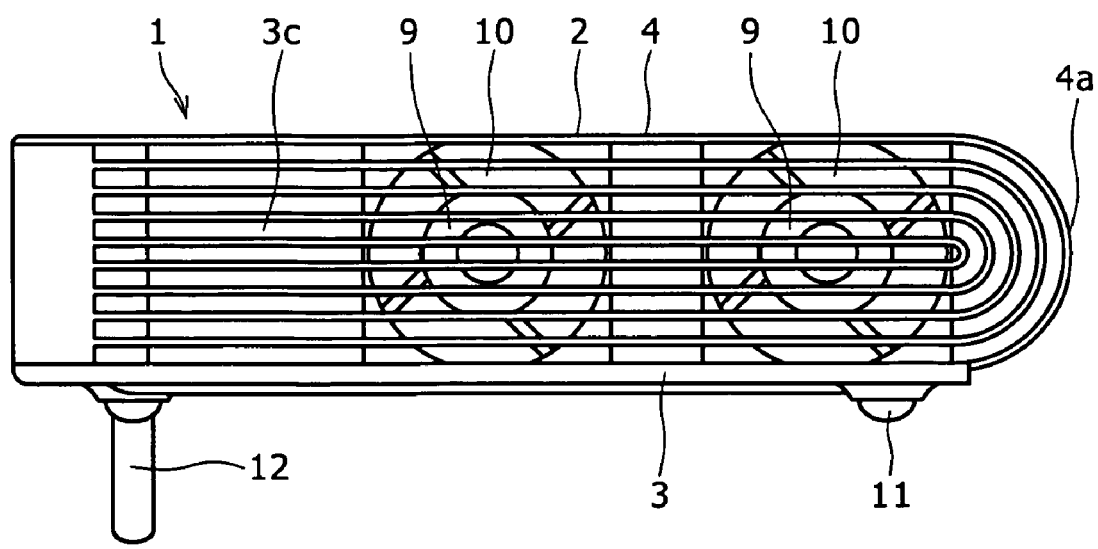
FIG. 4 is a right side view of the projection type display unit according to the embodiment.
Figure 5:
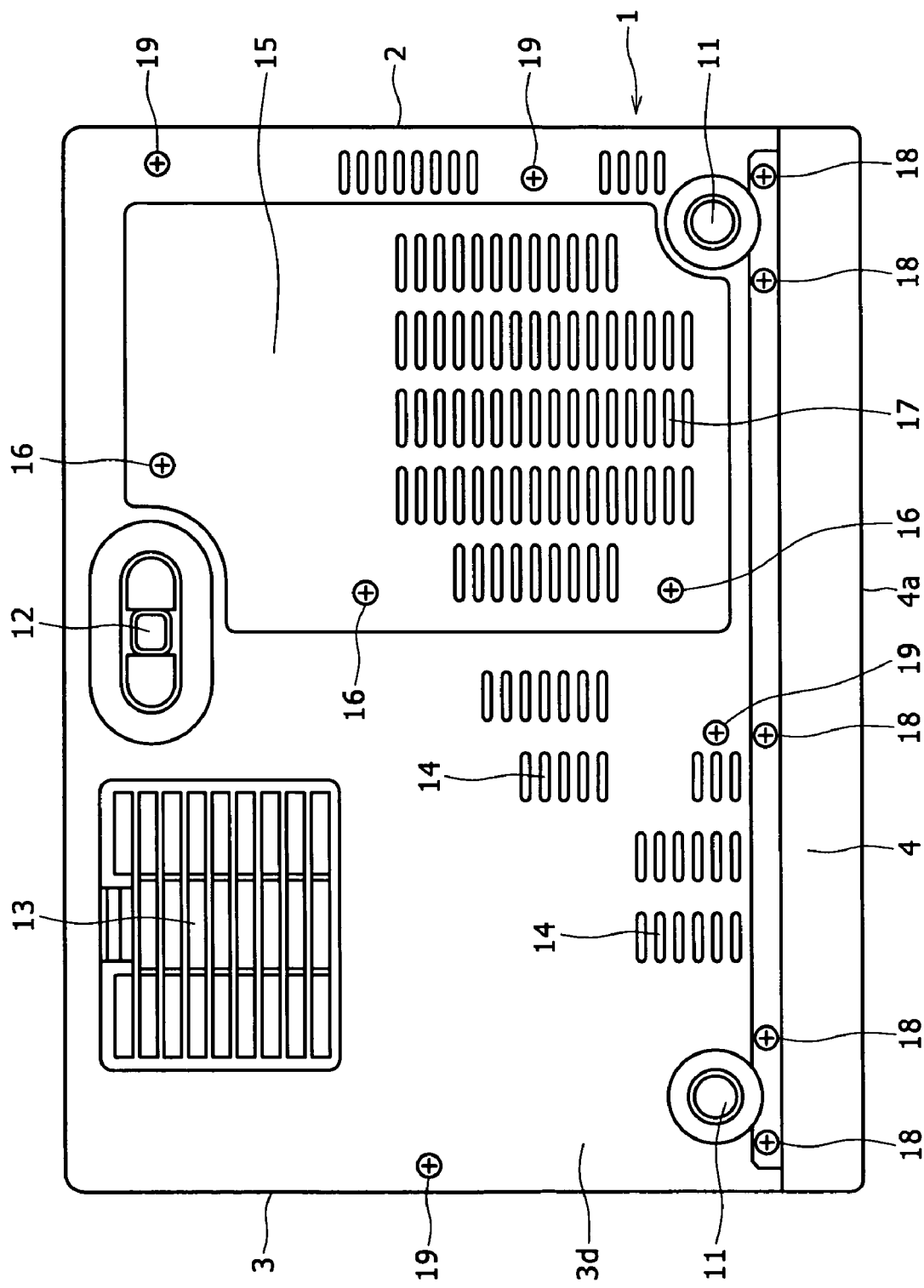
FIG. 5 is a bottom view of the projection type display unit according to the embodiment.

Now, an embodiment of the projection type display unit according to the present invention will be described in detail below, referring to the drawings. FIGS. 1 to 5 show the appearance of the projection type display unit in this embodiment, wherein FIG. 1 is a perspective view, FIG. 2 is a front view, FIG. 3 is a left side view, FIG. 4 is a right side view, and FIG. 5 is a bottom view. In addition, FIG. 6 is a plan view showing the inside structure of the projection type display unit in this embodiment.

The projection type display unit 1 shown here is a video projector which is of a small and thin type having a B5 size with a thickness of 50 mm or below, and in which light-weight is realized to have a weight of about 1.8 kg.

Figure 6:
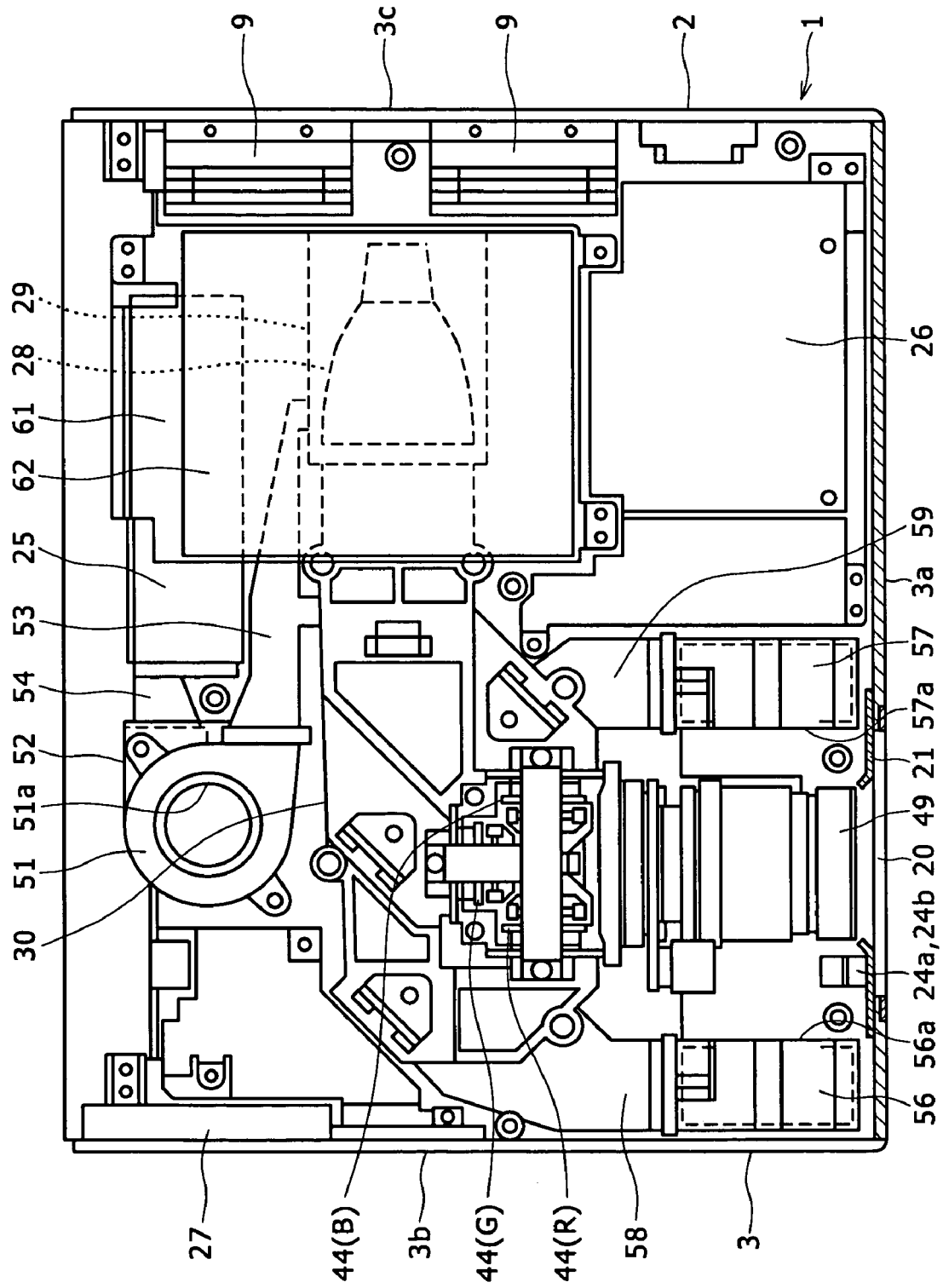
FIG. 6 is a plan view showing the inside structure of the projection type display unit according to the embodiment.

As shown in FIG. 6, the projection type display unit 1 has a configuration in which a lamp unit 29 containing a lamp 28 as a light source, and an optical unit 30 including three color light valves 44(R), 44(G), 44(B) and a projection lens 49 are incorporated in an armor cabinet 2. An image obtained by the light valves 44(R), 44(G), 44(B) with light emitted from the lamp unit 29 is projected through the projection lens 49 onto a screen, thereby displaying the image.

First of all, the armor configuration of the projection type display unit 1 will be described. The armor cabinet 2 of the projection type display unit 1 is composed of a base cabinet 3 onto which inside component parts such as the optical unit 30 are mounted, and a top cover 4 so mounted as to cover the base cabinet 3. Here, the base cabinet 3 is a die-cast product formed from a metallic material such as magnesium and aluminum, or is a resin molding formed from a hard resin material, and constitutes a bottom face portion, left and right side face portions, and a front face portion of the armor cabinet 2. On the other hand, the top cover 4 is a worked sheet metal product produced by drawing a sheet metal of an aluminum alloy or the like, and constitutes an upper face portion and a rear face portion of the armor cabinet 2.

The top cover 4 is fixed, in the state of being mounted on the base cabinet 3, by screws 18 and 19 from the bottom side of the base cabinet 3.

As shown in FIG. 2, the projection lens 49 is exposed through a transparent protective plate 20 to a front panel 3a constituting a front face portion of the armor cabinet 2, and image light is projected from the projection lens 49 onto a screen. Here, the transparent protective plate 20 is disposed to be flush with the front panel 3a, and the projection lens 49 is hermetically sealed and protected by the protective plate 20. Further, on the inside of the protective plate 20, a projection distance detecting sensor 24a, 24b for auto-focusing is provided at a position proximate to the projection lens 49, by way of a semi-transparent member 21.

At a left side face 3b of the base cabinet 3, an operating part 6 and a terminal part 7 are concentratedly disposed, as shown in FIG. 3. Here, the operating part 6 is configured to have a power switch button 6a, an input signal changeover button 6b, an auto-focus changeover button 6c, a tilt adjustment button 6d, a zoom adjustment button 6e, a focus button 6f and the like, and the terminal part 7 is configured to have a power cord connection terminal 7a and a picture signal input terminal 7b. On the other hand, at a right side face 3c on the opposite side of this, exhaust ports (louvers) 10 for axial fans 9 for discharging the heat of the lamp 28 as a light source are provided, as shown in FIG. 4.

A bottom face 3d of the base cabinet 3 is provided with fixing legs 11 at left and right positions of a rear face portion, and with an expansion leg 12 at a front central position, as shown in FIG. 5. The expansion leg 12 is expanded and contracted so as to project outward from and retract inward from the base cabinet 3, and an adjustment of projection angle of the display unit (tilt adjustment) is conducted through the movements of the expansion leg 12. In addition, the bottom face 3d of the base cabinet 3 is provided with an intake part 13 for a sirocco fan serving as a cooling section and with a multiplicity of ventilation holes 14, and a resin-made lamp lid 15 for closing an opening for replacement of the lamp unit 29 as the light source is attached to the bottom face 3d by screws 16. The lamp lid 15 is provided with a multiplicity of exhaust heat holes 17 for discharging the heat generated in the lamp unit 29.

Figure 7:
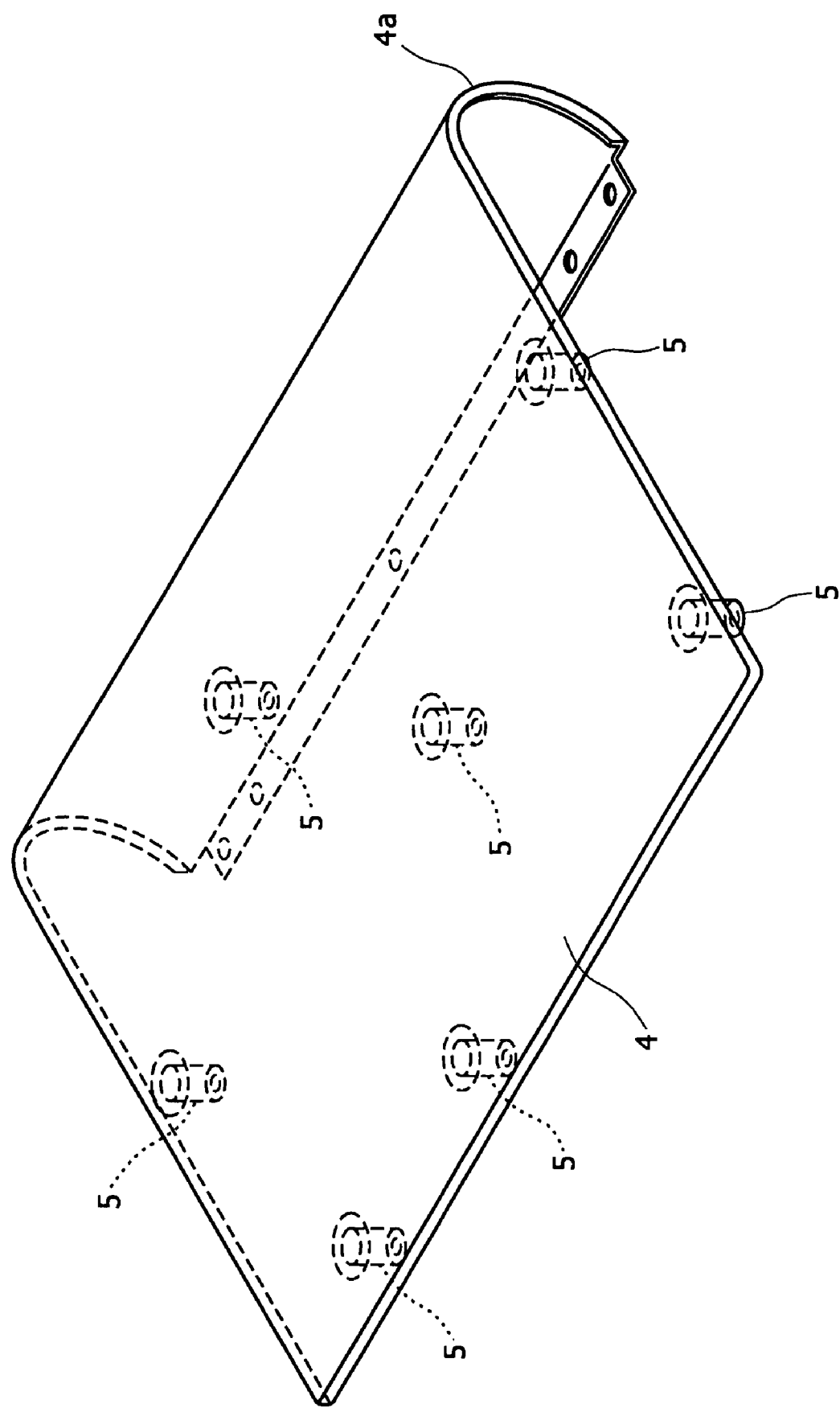
FIG. 7 is a perspective view of a top cover in the projection type display unit according to the embodiment of the present invention.
Figure 8:
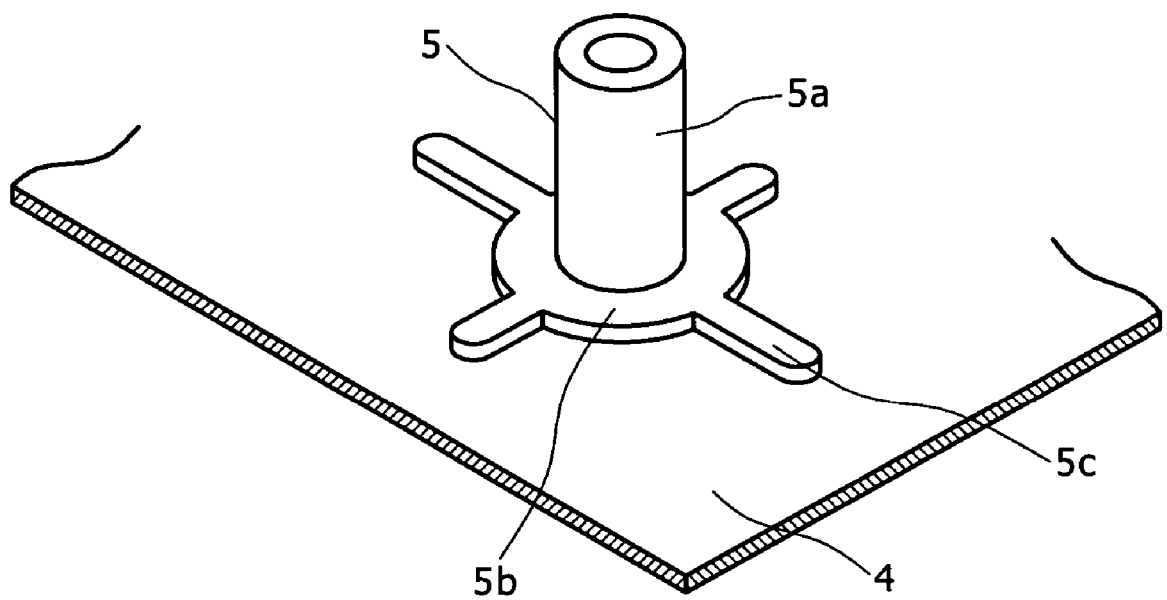
FIG. 8 is a perspective view showing the shape of each boss projectingly provided on the back side of the top cover in the projection type display unit according to the embodiment.

In the projection type display unit 1 in this embodiment with the above-described armor configuration, the top cover 4 constituting the upper face portion and the rear face portion of the armor cabinet 2 is produced by blanking an about 1 mm thick sheet metal by a press and drawing the blanked sheet metal. As the material of the top cover 4, there is preferably used an aluminum alloy as a metallic material which has a required strength for enduring as the armor of the projection type display unit 1 (in this embodiment, a flexural strength of not less than 15 kgf (147 N)) and which is light in weight and excellent in heat radiating property (thermal conductivity). As shown in FIGS. 7 and 8, a plurality of bosses 5 for screwing the top cover 4 to the base cabinet 3 are projectingly provided on the back side of the top cover 4.

The bosses 5 are molded integrally with the sheet metal of the top cover 4 by outsert molding, from a resin material being different from the material of the sheet metal (aluminum alloy) of the top cover 4, preferably a hard resin material such as PBT (polybutylene terephthalate). In this case, a surface of the sheet metal is provided with fine recesses and projections on the nanometer level by a nano-mold technology (NMT) process so as to permit the resin to enter into the recessed and projected surface, whereby a bonding property based on a key structure with the resin is provided so that the resin is molded in the state of being firmly attached to the surface of the sheet metal. In this structure, the strength of fixation of the plurality of bosses 5 to the top cover 4 can be maintained inexpensively and assuredly.

The plurality of bosses 5 are provided at such positions as not to interfere with the component parts in the inside of the display unit. Each of the bosses 5 is provided at its base end portion with a pedestal part 5b greater in diameter than a boss body portion 5a, whereby the area of joint to the top cover 4 is enlarged, and a sufficient fixation strength is secured. Furthermore, resin runner parts 5c are extended from the pedestal part 5b, whereby the area of fixation of the boss 5 to the top cover 4 is further enlarged. Besides, in this configuration, when the plurality of bosses 5 are interconnected by the resin runner parts 5c, the strength of fixation of the bosses 5 to the top cover 4 is further increased, and the plurality of bosses 5 can be molded using a single gate at the time of molding, so that there is generated the merit that the molding die can be simplified in structure. Incidentally, the bosses 5 may not necessarily be molded by the above-mentioned nano-mold technology process; for example, the bosses 5 may be integrally fixed to the top cover 4 by welding or by use of a strong adhesive.

In mounting the top cover 4 having the bosses 5 onto the base cabinet 3, the top cover 4 is put on the base cabinet 3. Then, in this condition, an end portion on the rear side of the top cover 4 is fixed to the bottom face 3d of the base cabinet 3 by the screws 18, and the screws 19 are fastened to the bosses 5 from the side of the bottom face 3d of the base cabinet 3, whereby the base cabinet 3 and the top cover 4 are fixed.

Since the top cover 4 is made of a sheet metal, it is superior to a resin or the like in strength and heat radiating property; thus, this configuration is preferable for adoption for the armor cabinet 2 of the projection type display unit 1 as in this embodiment, and has a lowering effect on the inside temperature. With the sheet metal top cover 4 adopted, in the projection type display unit 1 according to this embodiment, the upper face portion of the armor cabinet 2 can be minimized in thickness, which contributes greatly to the achievement of a super-thin configuration with a thickness of 50 mm or less. With the super-thin configuration thus achieved, the projection type display unit 1 in this embodiment can be carried while easily gripped with one hand, which is advantageous on a portability basis.

Furthermore, for enhancing portability, the projection type display unit 1 in this embodiment has a structure in which, as is clear from the above-mentioned armor configuration, the operating part 6 and the terminal part 7 are concentratedly disposed at one side face (left side face) of the armor cabinet 2, while the side face (right side face) on the opposite side is provided with the exhaust port 10 for discharging the heat generated in the lamp unit 29, and no parts are disposed at the rear face portion on the opposite side of the opening for the projection lens 49 exposed to the front panel 3a so that the portion is easily held by gripping it with hand. The rear face portion of the armor cabinet 2 is composed of the sheet metal top cover 4 as above-described, and, particularly in the projection type display unit 1 according to this embodiment, the rear face portion 4a of the top cover 4 is formed in the shape of a laid-down U-shaped curved surface as viewed sideways.

Figure 9:
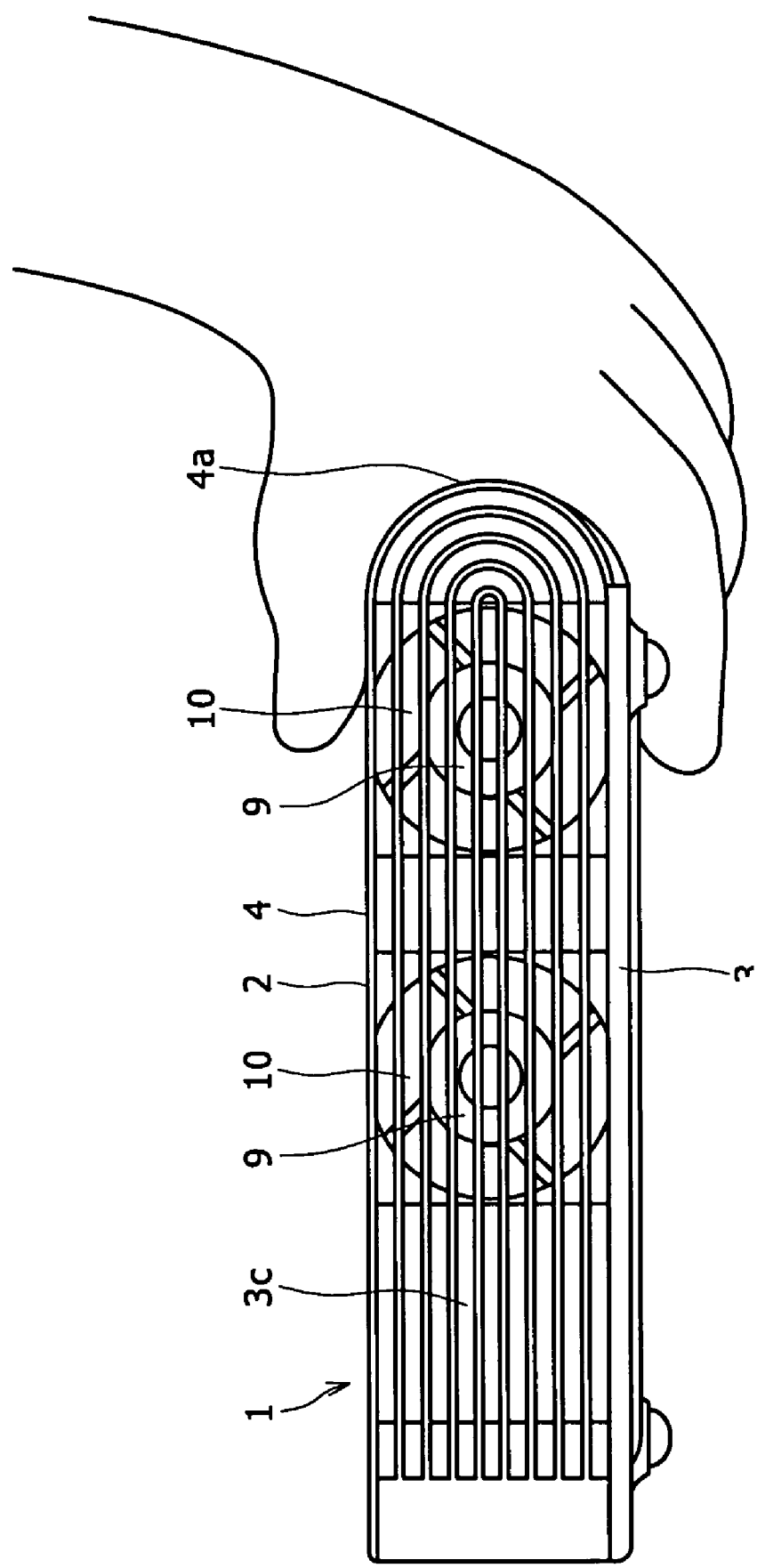
FIG. 9 is an illustration of the condition where the projection type display unit according to the embodiment is gripped by one hand.

Thus, the projection type display unit 1 in this embodiment is configured to have a thickness of 50 mm or less and has the rear face portion 4a of the top cover 4 formed in the shape of the U-shaped curved surface, whereby the portion can be securely gripped with one hand, as shown in FIG. 9. Specifically, where the rear face portion 4a of the top cover 4 has a general angular shape, the depth of grip to the fingertips is small, so that the state of being gripped with one hand will be instable. In this embodiment, on the other hand, the rear face portion 4a of the top cover 4 is formed in the shape of the U-shaped curved surface, the portion fits to the palm favorably on an ergonomic basis, and the grip on the display unit ranges to the fingertips, so that the display unit can be gripped securely and assuredly even with one hand.

In this configuration, the rear face portion 4a of the top cover 4 is preferably formed in a circular arc shape with a radius R of about one half of the thickness T of the armor cabinet 2 ($R = \frac{1}{2} \times T$), or may be formed in the shape of a continuous curve such as a parabola and an ellipse. This makes it possible to realize a curved surface shape just fitted to the shape of a palm at the time of holding the display unit by hand, and to enhance the portability of the display unit.

Since the top cover 4 is produced by drawing a sheet metal, the curved surface shape can be easily obtained. In addition, since the top cover 4 has the resin-made bosses 5 on the back side thereof and is screwed to the base cabinet 3 side at the bosses 5, no projecting parts are present on the outside surface of the top cover 4, and hampering of the carrying of the display unit by such projecting parts can be obviated, which is much advantageous for enhancing the portability. Besides, since the top cover 4 is produced from a sheet metal by drawing as above-mentioned, generation of a parting line on the split line of dies as experienced in the case of a resin molding is obviated, so that a projection type display unit with a streamlined appearance design can be provided. Furthermore, in this projection type display unit, the absence of projecting parts or the parting line on the outside surface of the top cover 4 makes it possible to adopt any of a diversity of designs, and to enhance the degree of freedom in designing.

Furthermore, in this projection type display unit, the bosses 5 for screwing the top cover 4 are formed from a resin which is an insulating material and different from the material of the sheet metal (aluminum alloy), so that there is no fear that cutting chips generated from the bosses 5 at the time of fastening the screws 19 to the bosses 5 might adversely affect a power circuit and the like inside the display unit. In addition, since the bosses 5 are molded integrally with the top cover 4 by outsert molding and are integrated with the top cover 4 with a sufficient fixation strength by a nano-mold technology process, there is no need for fixing members or an adhesive or the like for fixing the bosses 5 to the top cover 4, so that it is possible to reduce the number of component parts, to enhance workability, and to obtain improving effects on an environmental basis.

Figure 10:
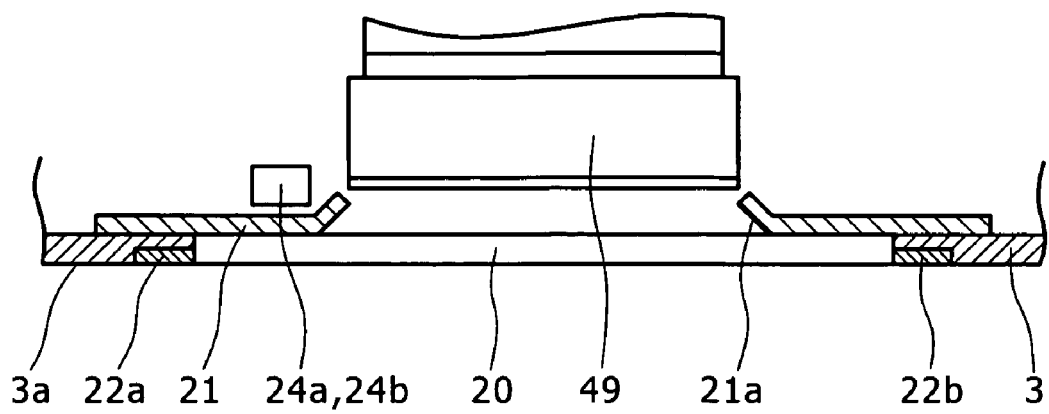
FIG. 10 is a side sectional view showing the structure in the vicinity of an exposing portion of a projection lens in the projection type display unit according to the embodiment.
Figure 11:
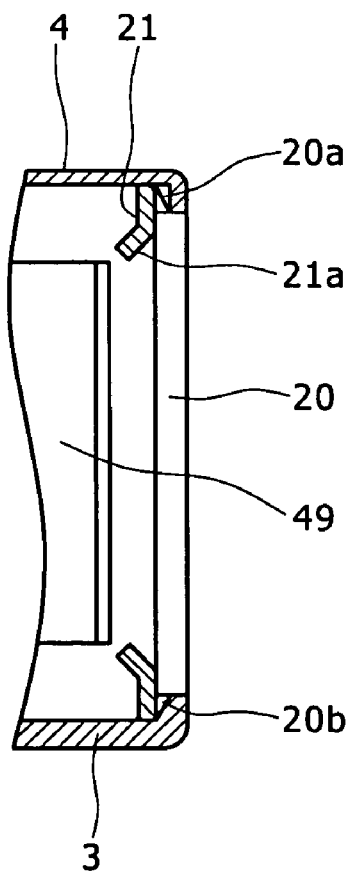
FIG. 11 is a vertical sectional view showing the structure in the vicinity of an exposing portion of a projection lens in the projection type display unit according to the embodiment.

FIGS. 10 and 11 show the structure of the vicinity of the exposing portion of the projection lens 49 in the front panel 3a. As shown here, in the display unit according to this embodiment, a transparent protective plate 20 fitted in position to be flush with the front panel 3a is disposed on the front side of the projection lens 49, so that the front side of the projection lens 49 is hermetically sealed by the protective plate 20, and the projection lens 49 is protected by the protective plate 20.

The protective plate 20 is formed of a transparent resin or glass, which is provided with AR coating on the face and back sides thereof to suppress the lowering in luminance efficiency to 1% to 2%. The protective plate 20 is fitted in the front panel 3a, and is clamped between the top cover 4 and the base cabinet 3. The protective plate 20 is provided with flange portions 20a, 20b at its upper and lower end surfaces, and the flange portions 20a, 20b are engaged respectively with the top cover 4 and the base cabinet 3, whereby the protective film 20 is prevented from coming off and is retained in position. Incidentally, the front panel 3a located on the left and right sides of the protective plate 20 is fitted with decorative plate 22a and 22b for enhancing design quality.

Furthermore, on the inner side of the protective plate 20 in the inside of the display unit in this embodiment, a plate-like semi-transparent member 21 a little greater than the protective plate 20 is disposed. The semi-transparent member 21 is fixedly fused to the inner side of the front panel 3a, and is provided in its central portion with an opening corresponding to the projection lens 49 so that the projection lens 49 is exposed through the opening. On the inner side of the semi-transparent member 21, a projection distance detecting sensor 24a, 24b for auto-focusing is disposed in proximity to the projection lens 49. The projection distance detecting sensor 24a, 24b has a light emitting device on one side and a light receiving device on the other side. An infrared beam emitted from the light emitting device toward a screen is reflected by the screen, and the reflected beam is received by the light receiving device, to thereby measure the projection distance, for automatically conducting an auto-focus adjustment of the projection lens 49 and up and down adjustment for keystone correction.

Here, a semi-transparent resin or glass having a visible ray transmittance of 10% to 50% and a transmittance for the infrared beam for detecting the projection distance of not less than 90%. Examples of an optimum material for this purpose include a methacrylic resin molding material "ACRYPET"® produced by MITSUBISHI RAYON CO., LTD. With such a semi-transparent member 21 provided, the inside component parts are invisible from outside, so that the projection distance detecting sensor 24a, 24b can be disposed in proximity to the projection lens 49.

As above-described, the projection type display unit 1 according to this embodiment has a structure in which the transparent protective plate 20 fitted to be flush with the front panel 3a of the armor cabinet 2 is disposed on the front side of the projection lens 49, the semi-transparent member 21 having the opening corresponding to the projection lens 49 is disposed on the inner side of the transparent protective plate 20, and the projection distance detecting sensor 24a, 24b for auto-focusing is disposed on the inner side of the semi-transparent member 21, whereby a simple appearance with a surface free of an opening for sensor or the like is realized.

In this configuration, since the projection lens 49 is protected by the protective plate 20 assembled into the front panel 3a of the armor cabinet 2, the projection lens 49 is prevented from being damaged and from adhesion of foreign matter thereto. Further, since the protective plate 20 is so assembled as to be flush with the front panel 3a, dust collection in the vicinity of the protective plate 20 is obviated, so that hindrance of image due to adhesion of dust or the like can be suppressed.

In addition, in this projection type display unit, the front side of the projection lens 49 is hermetically sealed with the protective plate 20, so that penetration of dust or the like into the inside of the display unit is prevented perfectly, the path of a cooling airflow in the inside of the display unit is made stable, and cooling efficiency can be enhanced.

Besides, in this projection type display unit, a structure is adopted in which the semi-transparent member 21 is disposed on the inner side of the protective plate 20, and the projection distance detecting sensor 24a, 24b is disposed on the inner side of the semi-transparent member 21, whereby the projection distance detecting sensor 24a, 24b can be laid out in proximity to the projection lens 49. Therefore, space efficiency in the inside of the display unit is enhanced, which contributes greatly to the reduction in the size and thickness of the display unit.

Furthermore, in this configuration, the semi-transparent member 21 has the flange portion 21a projecting toward the projection lens 49, at an edge portion of the opening corresponding to the projection lens 49. Due to the presence of the flange portion 21a provided in the semi-transparent member 21, in the projection type display unit according to this embodiment, the light of the lamp 28 inside the display unit can be prevented from leaking to the front side of the projection lens 49 as unrequired reflected light (stray light).

In addition, in this configuration, the protective plate 20 is mounted in the state of being clamped between the top cover 4 and the base cabinet 3. Therefore, in the case where the protective plate 20 has been damaged or broken, the protective plate 20 can be easily replaced by a new one by detaching the top cover 4 from the base cabinet 3.

Now, the inside structure of the projection type display unit 1 according to this embodiment will be described below. As shown in FIG. 6, the projection type display unit in this embodiment has a configuration in which the lamp unit 29 including the lamp 28 as a light source, the optical unit 30 including the three light valves 44(R), 44(G), 44(B) and the projection lens 49, and the sirocco fans 51, 52 and 56, 57 and the axial fan 9 as a cooling section for cooling the lamp unit 29 and the optical unit 30, a power circuit unit 25 for supplying electric power to the lamp 28 and the like, a signal processing circuit unit 26, and an operating part and terminal part unit 27, and the like are mounted in the inside of the armor cabinet 2.

Figure 12:
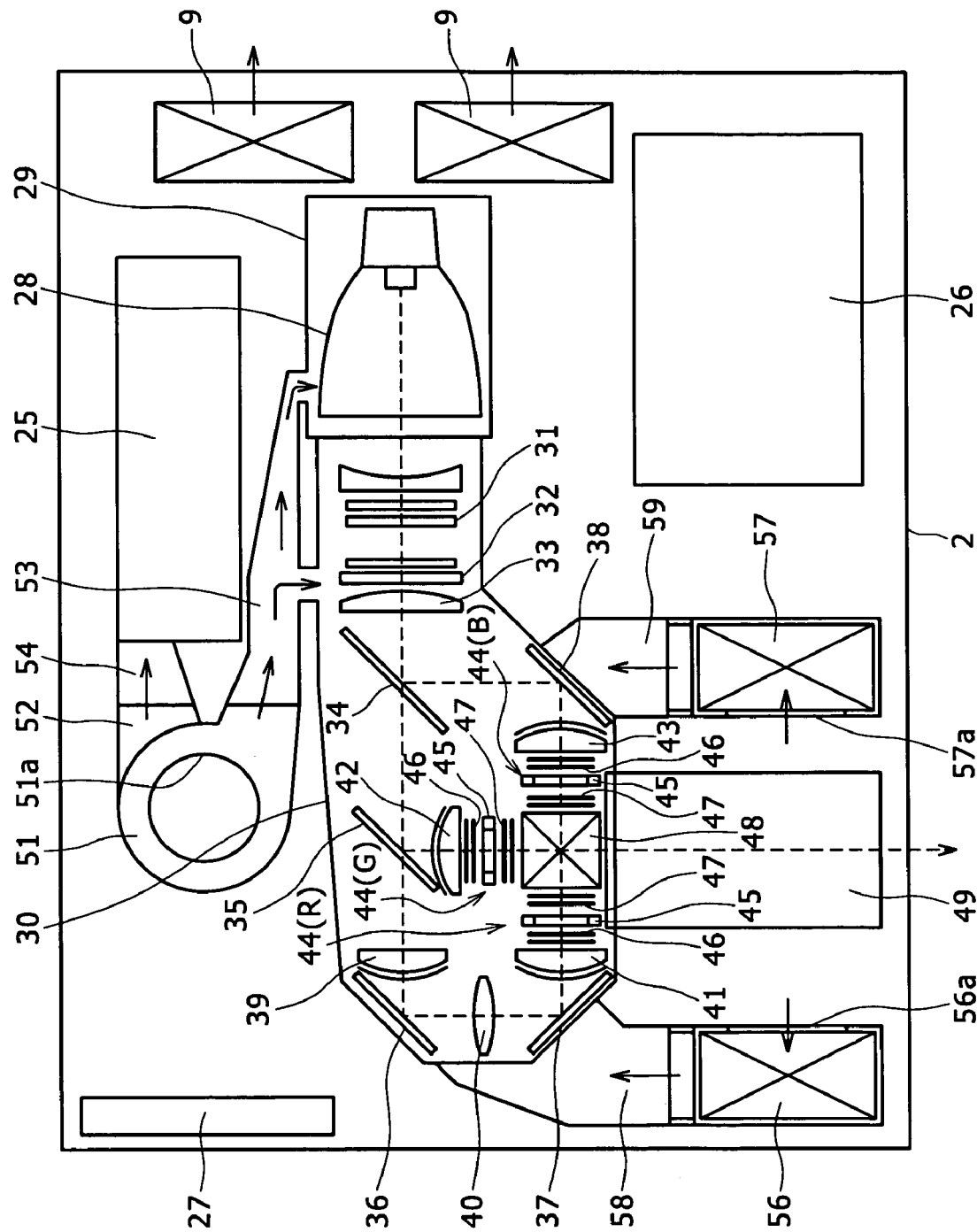
FIG. 12 is a schematic diagram showing the inside structure of the projection type display unit according to the embodiment.

The lamp unit 29 has a configuration in which the lamp 28 is mounted in the inside of a unit case, and can be replaced by opening the lamp lid 15 at the bottom face 3d of the base cabinet 3. As shown in FIG. 12, the optical unit 30 is configured to include a fly-eye lens 31, a polarization conversion element 32, a condenser lens 33, dichroic mirrors 34, 35, total reflection mirrors 36, 37, 38, relay lenses 39, 40, field lenses 41, 42, 43, the three light valves 44(R), 44(G), 44(B) including liquid crystal panels 45 as display elements, a prism 48, the projection lens 49, and the like.

In the optical unit 30, non-polarized white light emitted from the lamp 28 is converted into linearly polarized light while passing from the fly-eye lens 31 and through the polarization conversion element 32, and is condensed by the condenser lens 33 to be uniform white light free of luminance irregularities, and the white light free of luminance irregularities passes through the dichroic mirrors 34, 35, to be incident on the three light valves 44(R), 44(G), 44(B).

In this case, the white light is separated by the dichroic mirrors 34, 35 serving as color separation means into red light (R), green light (G), and blue light (B), and the red light passes through the relay lens 39, the total reflection lens 36, the relay lens 40 and the total reflection mirror 37 to be condensed by the field lens 41, before being incident on the red-light light valve 44(R). In addition, the green light passes through the dichroic mirror 35 to be condensed by the field lens 42, before being incident on the green-light light valve 44(G). Further, the blue light passes from the dichroic mirror 34 and through the total reflection mirror 38 to be condensed by the field lens 42, before being incident on the blue-light light valve 44(B).

The three light valves 44(R), 44(G), 44(B) are each configured to have polarizing plates 46 and 47 on the incidence side and the outgoing side of the liquid crystal panel 45, wherein each color light is aligned as to the polarization direction by the polarizing plate 46 on the incidence side, before being incident on the liquid crystal panel 45. The liquid crystal panel 45 modulates each light by a picture signal impressed correspondingly to each color; then, the three modulated beams thus obtained are polarized when transmitted through the polarizing plates 47 on the outgoing side to be picture beams, which are incident on the prism 48. In the prism 48, the picture beams in colors are synthesized, and the synthesized picture light is projected by the projection lens 49 onto a screen, to display a full-color image.

In the projection type display unit in this embodiment including the projection optical system configured as above, high heat is generated in the lamp unit 29, the vicinity of the polarization conversion element 32 and the light valves 44(R), 44(G), 44(B) in the optical unit 30, and the power circuit unit 25, so that these components must be forcibly cooled to maintain a temperature not higher than an operation assurance temperature.

The cooling structure will be described. As shown in FIGS. 6, 12, 13A and 13B, in the projection type display unit according to this embodiment, the first and second sirocco fans 51 and 52 are first mounted as a cooling section. As the first and second sirocco fans 51 and 52, small-type sirocco fans of the same type are used. The sirocco fans 51 and 52 in a stacked state, with an intake port 51a of the first sirocco fan 51 directed upward and with an intake port 52a of the second sirocco fan 52 directed downward, are disposed in a space on the rear side of the optical unit 30. In this case, the first and second sirocco fans 51 and 52 are mounted onto the base cabinet 3 in the condition where intake spaces for the intake ports inside the display unit are sufficiently secured, and the intake of air is conducted through a multiplicity of ventilation holes 14 provided in the bottom face 3d of the base cabinet 3.

In this configuration, the first sirocco fan 51 blows air through a duct 53 to the lamp unit 29 and to the vicinity of the polarization conversion element 32 in the optical unit 30 to cool them, as shown in FIG. 13A, whereas the second sirocco fan 52 blows air through a duct 54 to the power circuit unit 25 to cool it, as shown in FIG. 13B.

In such a cooling section, a sufficient quantity of cooling airflow can be secured by use of the two small-type sirocco fans, and the installation space inside the display unit can be suppressed to be small by disposing the sirocco fans 51 and 52 in the stacked state; therefore, the configuration of the cooling section can contribute greatly to the reductions in the size and thickness of the projection type display unit according to this embodiment.

Furthermore, in such a cooling section, the first sirocco fan 51 blows air to the lamp unit 29 and the optical unit 30, whereas the second sirocco fan 52 blows air to the power circuit unit 25, so that the flows of the cooling airflows inside the display unit are optimized, and efficient cooling is thereby achieved. Incidentally, the first sirocco fan 51 and the second sirocco fan 52 may be disposed in the reverse configuration, in which the first sirocco fan 51 blows air to the power circuit unit 25, whereas the second sirocco fan 52 blows air to the lamp unit 29 and the optical unit 30; in this case, also, the same cooling effect as above can be obtained.

As further a cooling section, in the projection type display unit according to this embodiment, the third and fourth sirocco fans 56 and 57 are disposed respectively on the left and right sides of the projection lens 49. The third and fourth sirocco fans 56 and 57 are laid out by effectively utilizing the spaces on the left and right sides of the projection lens 49. Here, the third sirocco fan 56 and the fourth sirocco fan 57 are not the same in shape but are left-right symmetrical in shape, and they are mounted onto the base cabinet 3, with their respective intake ports 56a and 57a directed toward the projection lens 49. The intake of air into the third sirocco fan 56 and the fourth sirocco fan 57 is conducted on the lower side of the projection lens 49 through a dust-filtered intake part 13 provided in the bottom face 3d of the base cabinet 3.

In this configuration, the third sirocco fan 56 and the fourth sirocco fan 57 blow air through thin-type ducts 58 and 59, which are provided along a bottom portion of the base cabinet 3, to the vicinity of the light valves 44(R), 44(G), 44(B) of the optical unit 30 for cooling the vicinity of the light valves 44(R), 44(G), 44(B).

By such a configuration in which the vicinity of the light valves 44(R), 44(G), 44(B) of the optical unit 30 are cooled by the third sirocco fan 56 and the fourth sirocco fan 57, the flows of the cooling airflows inside the display unit are further optimized, and further efficient cooling can be achieved.

In this case, particularly in the cooling section, the sirocco fans 56 and 57 in left-right symmetrical shapes are disposed, whereby the cooling efficiency can be further enhanced. To be more specific, if the left and right sirocco fans 56 and 57 are the same in shape, the left and the right sirocco fans are disposed in the inverted states, so that the respective blowing ports are located reversely in the vertical direction, which needs ducts with complicated paths, with the result that air quantity is lowered due to a pressure loss in the ducts. In the case of the cooling section in this embodiment, on the other hand, the left and right sirocco fans 56 and 57 which are left-right symmetrical in shape are used, whereby it is made possible to use the thin-type ducts 58 and 59 with simple paths along the bottom portion of the base cabinet 3, so that the airflows from the blowing ports of the sirocco fans 56 and 57 can be guided to the optical unit 30 without resistance, and the cooling efficiency is enhanced markedly.

In addition, in this configuration, the intake of air into the sirocco fans 56 and 57 disposed on the left and right sides of the projection lens 49 is conducted on the lower side of the projection lens 49 through the dust-filtered intake part 13 provided in the bottom face 3d of the base cabinet 3; therefore, intake of dust or the like is prevented by the dust filter at the intake part 13, so that the projection lens 49 and the optical unit 30 can be securely protected from dust and the like.

Further, in the projection type display unit according to this embodiment, for enhancing the cooling efficiency particularly in the vicinity of the lamp unit 29 which generates a large quantity of heat, the two axial fans 9 located in the vicinity of the lamp unit 29 on the inner side of the right side face 3c of the base cabinet 3 are disposed side by side, and the hot air generated from the lamp unit 28 is discharged through the exhaust port 10 by the axial fans 9.

Besides, in order to realize a thin form with a thickness of 50 mm or below and portability as in the projection type display unit according to this embodiment, the top cover 4 near the lamp unit 29 generating a large quantity of heat must be kept at such a temperature that the top cover 4 can be held by hand, while minimizing the space between the lamp unit 29 and the top cover 4. For this reason, in the projection type display unit according to this embodiment, a lamp plate 61 which is a highly heat conductive sheet metal product higher in thermal conductivity than air is disposed in the space between the lamp unit 29 and the top cover 4, whereby it is made possible to lower the temperature of the top cover 4.

Figure 14:
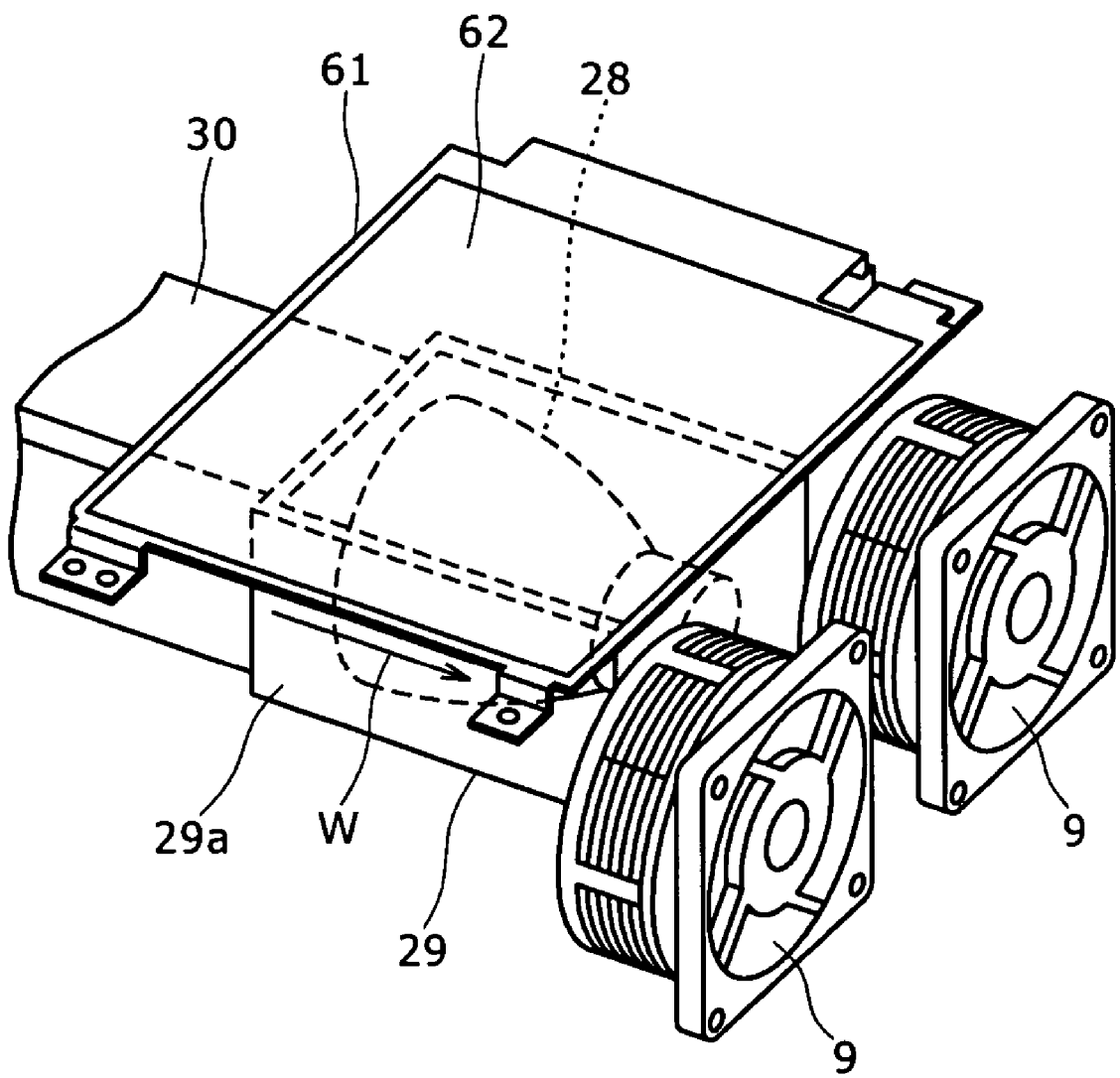
FIG. 14 is a perspective view showing the layout configuration of a lamp plate in the projection type display unit according to the embodiment.

As shown in FIG. 14, the lamp plate 61 is a sheet metal product disposed so as to amply cover the upper side of the lamp unit 29, and a heat-diffusing effect of a highly heat conductive material constituting the lamp plate 61 makes it possible to lower the temperature of the top cover 4 while minimizing the distance from the lamp unit 29 to the top cover 4. Further, a lowly heat conductive heat insulating sheet 62 lower in thermal conductivity than air is adhered to substantially the whole area of the upper surface of the lamp plate 61, and the heat-insulating effect of the heat insulating sheet 62 makes it possible to further lower the temperature of the top cover 4. In this configuration, a highly heat conductive metal such as pure aluminum (JIS A1000) and copper is used as the material of the lamp plate 61, whereas a vacuum insulation material, for example, is used as the heat insulating sheet 62.

In this configuration, where it is desired to suppress the temperature of the top cover 4 to a temperature of 40° C. to 50° C. which permits the user to hold the top cover 4 with hand without any problem, it is necessary to use a sheet having a thermal conductivity of 0.0044 W/mK and a thickness of about 1.5 mm as the heat insulating sheet 62 and to suppress the temperature of the lamp plate 61 to a temperature of about 70° C. to 80° C. For achieving this temperature, a material having a high thermal resistance and a high thermal conductivity is used for the lamp plate 61 so that the quantity of heat received from the lamp 28 is efficiently diffused in the surface directions. Here, in the case where an extra-high pressure mercury lamp in a 165 W class, for example, is used as the lamp 28, when a material having a thermal conductivity of about 200 W/mK such as pure aluminum is used for the lamp plate 61, the temperature of the lamp plate 61 can be suppressed to about 80° C. with a heat radiating area of 9000 mm$^2$; when a material having a thermal conductivity of about 400 W/mK such as copper is used for the lamp plate 61, the temperature of the lamp plate 61 can be suppressed to or below 80° C. with a heat radiating area of about 6000 mm$^2$.

Thus, in the projection type display unit according to this embodiment, the lowering of the temperature of the top cover 4 is achieved while realizing a thin type structure in which the space between the lamp unit 29 and the top cover 4 is minimized, by the heat diffusing effect of the lamp plate 61 disposed between the lamp unit 29 and the top cover 4 and the heat insulating effect of the heat insulating sheet 62.

As for the layout in this configuration, the lamp unit 29, the lamp plate 61, the heat insulating sheet 62, and the top cover 4 are laid out in this order, and, here, the lamp plate 61 formed of a highly heat conductive material is disposed between the heat insulating sheet 62 and the lamp unit 29, so that a lowly heat conductive material being comparatively low in heat resisting temperature can be used for the heat insulating sheet 62. In this case, with a metal as a highly heat resistant material used for the lamp plate 61, it is possible to cope with the purpose under the high-temperature conditions in the vicinity of the lamp unit 29.

Besides, in this configuration, the lamp plate 61 is preferably composed of a sheet metal product which has a high reflectance in addition to the high thermal conductivity. To be more specific, by adopting the lamp plate 61 with such a high reflectance, the reception of heat due to direct light and radiant heat from the lamp 28 can be minimized, so that the adoption is further effective in lowering the temperature of the top cover 4.

Further, in this configuration, the lamp plate 61 is disposed so that its heat radiating surface fronts on the space near the axial fans 9 where the velocity of the cooling airflows inside the display unit is comparatively high, whereby heat radiation at high efficiency can be achieved. To be more specific, in the space near the axial fans 9 inside the display unit, the velocity of airflows W is comparatively as high as about 1 m/s to 1.5 m/s due to the exhaust force of the axial fans 9, and, with the lamp plate 61 disposed so that its heat radiating surface fronts on the space, the quantity of heat received from the lamp 28 can be efficiently diffused, so that heat radiation at a higher efficiency can be achieved, which contributes greatly to lowering of the temperature of the top cover 4.

Besides, in this configuration, the lamp unit 29 has the lamp 28 contained inside the unit case 29a having a reflector on the inside thereof. Here, particularly in the projection type display unit according to this embodiment, the upper side of the unit case 29a is opened in shape, and the lamp plate 61 is closely disposed so as to cover the open side, thereby functioning also as a reflector. With such a configuration, the distance between the lamp 28 and the lamp plate 61 can be minimized, which is further advantageous for thinning the display unit.

Figure 15:
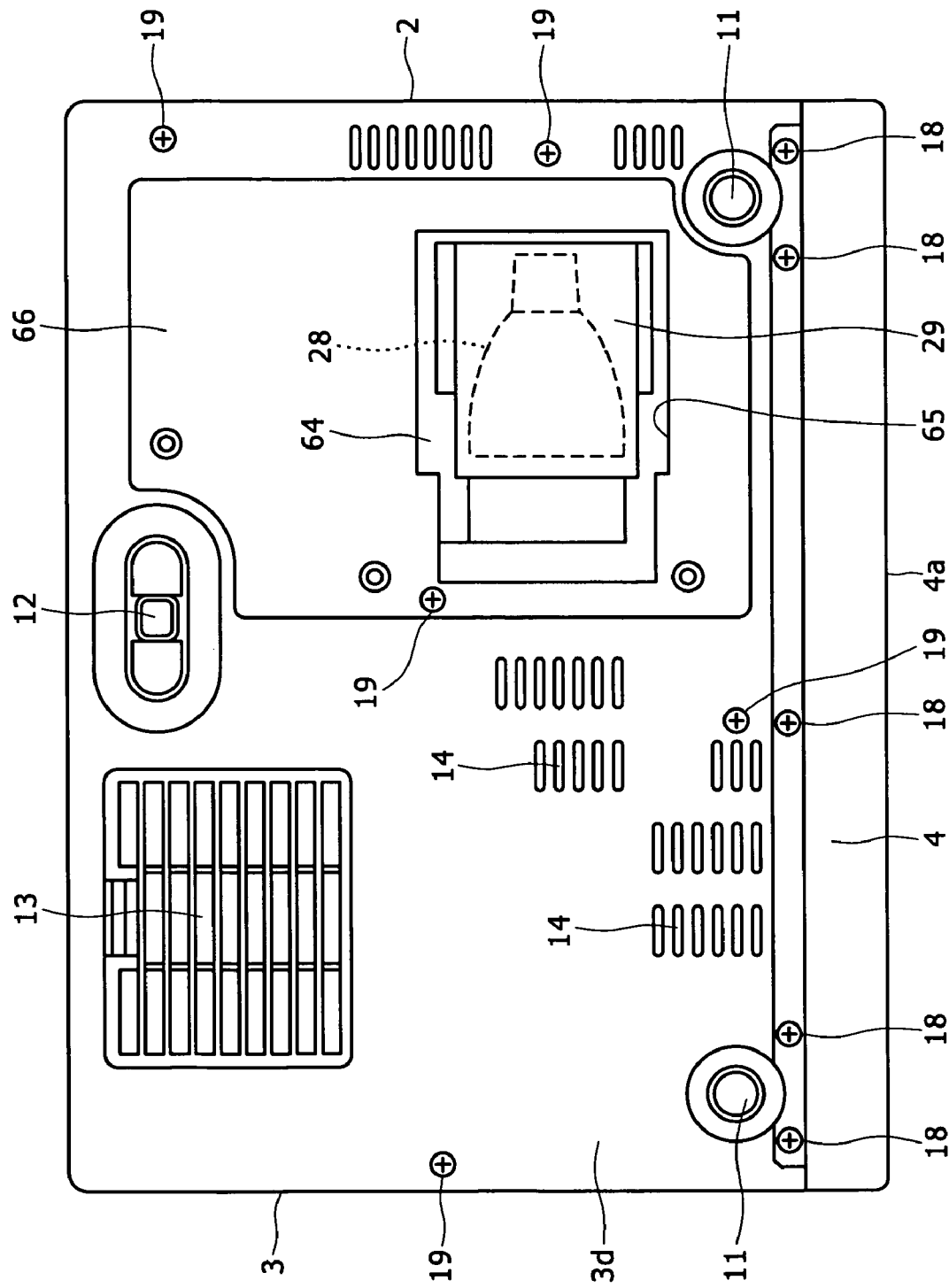
FIG. 15 is a bottom view showing the condition where a lamp lid is removed, in the projection type display unit according to the embodiment.

Further, in the projection type display unit according to this embodiment, as a heat radiation structure in the vicinity of the lamp unit 29, the structure of the lamp lid 15 for replacement of the lamp unit 29 is provided with a characteristic feature. The structure of the lamp lid 15 will be described referring to FIGS. 15 to 17. FIG. 15 shows the bottom face of the base cabinet 3 in the condition where the lamp lid is removed. In the condition where the lamp lid is thus removed, an opening 65 of a storage part 64 for storing the lamp unit 29 is exposed at the bottom face 3d of the base cabinet 3, so that the lamp unit 29 can be replaced through the opening 65.

Figure 16:
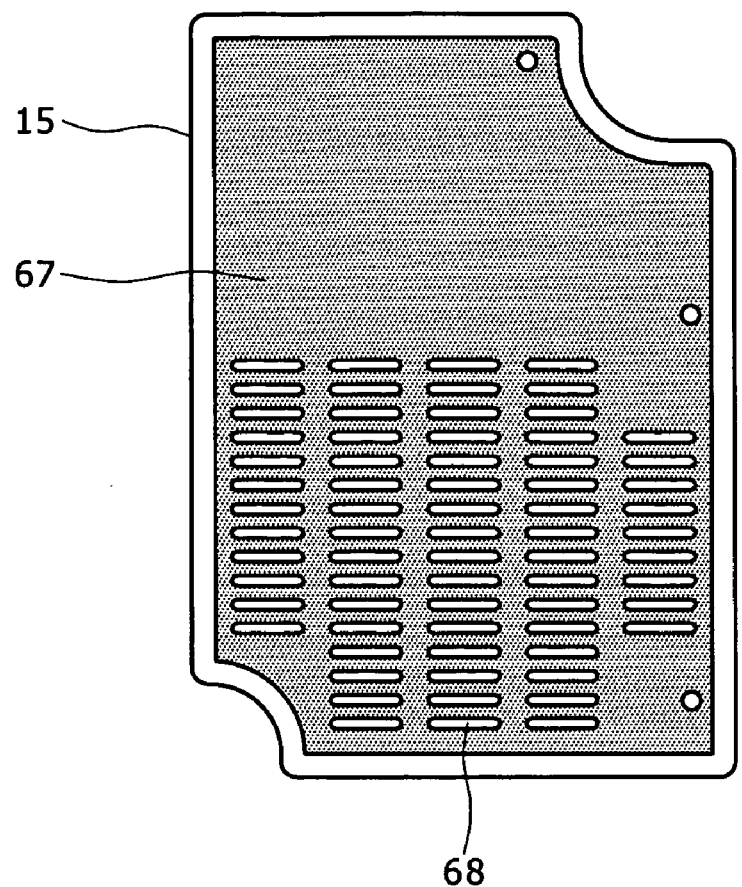
FIG. 16 is a plan view, as viewed from the back side, of the lamp lid mounted in the projection type display unit according to the embodiment.

The resin-made lamp lid 15 for closing the opening 65 is mounted onto the base cabinet 3 by screws in the state of being fitted in a mounting recess 66 at the periphery of the opening 65, and has a large area of not less than two times the area of the opening 65. Further, as shown in FIG. 16, a metallic radiant heat insulating plate 67 slightly smaller than the lamp lid 15 in area is disposed on the back side of the lamp lid 15, and is mounted onto the lamp lid 15, with a required gap of about 1 mm therebetween. A sheet of a metal (e.g., aluminum, stainless steel or the like) higher in thermal reflectance than the lamp lid 15 is used as the radiant heat insulating plate 67.

Figure 17:
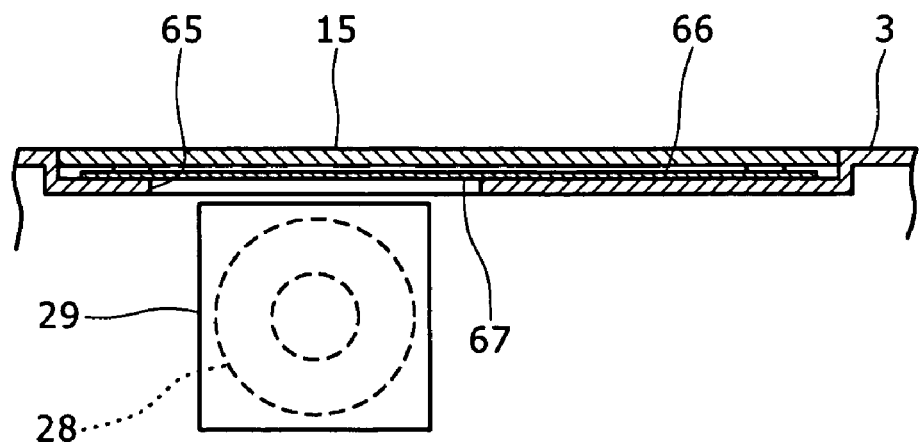
FIG. 17 is a vertical sectional view showing the mounting structure of the lamp lid in the projection type display unit according to the embodiment.

In the condition where the lamp lid 15 is mounted onto the base cabinet 3, as shown in FIG. 17, the lamp lid 15 is mounted in the condition where the radiant heat insulating plate 67 on the back side is in surface contact with the mounting recess 66 of the base cabinet 3 over an area of not less than one half of the area thereof.

Thus, in the projection type display unit according to this embodiment, the metallic radiant heat insulating plate 67 is provided on the back side of the lamp lid 15 for closing the opening 65 of the storage part 64 for the lamp unit 29, so that the radiant heat insulating plate 67 functions as a buffer member against the heat coming from the lamp unit 29. Moreover, since a gap is present between the radiant heat insulating plate 67 and the lamp lid 15, heat would not easily be transferred from the radiant heat insulating plate 67 to the lamp lid 15, so that the temperature of the lamp lid 15 is effectively restrained from rising.

Furthermore, in this configuration, since the lamp lid 15 is mounted in the condition where the radiant heat insulating plate 67 on the back side is in surface contact with the base cabinet 3, the heat received from the lamp unit 29 can be transferred from the radiant heat insulating plate 67 to the base cabinet 3 and thereby dissipated. In this case, particularly in the configuration according to this embodiment, the lamp lid 15 is formed to have a size of at least two times the size of the opening 65, and the radiant heat insulating plate 67 is put in surface contact with the base cabinet 3 over an area of at least one half of the area thereof, whereby a further efficient heat radiating effect can be obtained. As a result, the surface temperatures of the lamp lid 15 and the base cabinet 3 are made uniform, and the inside temperature of the display unit can be stabilized.

Besides, as shown in FIG. 16, the radiant heat insulating plate 67 is provided with a multiplicity of exhaust heat holes 68. The exhaust heat holes 68 in the radiant heat insulating plate 67 are formed at positions corresponding to the exhaust heat holes 17 in the lamp lid 15, ventilation property is securely provided by the exhaust heat holes 17 and 68, whereby stagnation of heat inside the display unit is prevented from occurring, and more effective heat radiation can be achieved.

By the heat radiation structure as above-described, the projection type display unit according to this embodiment has been experimentally confirmed to have an advantage that the surface temperature of the lamp lid is lowered by about 4° C.

Incidentally, in this configuration, the base cabinet 3 is preferably formed of a metal having a required strength, being light in weight and excellent in heat radiation property, for example, magnesium, aluminum, or titanium, or an alloy containing such a metal. This ensures that the projection type display unit in this embodiment can be reduced in size and weight while maintaining the above-mentioned heat radiating effect.

While the present invention has been described referring to the embodiment above, the invention naturally is not limited to the configurations of the embodiment, and other various embodiments can naturally be adopted.

What is claimed is:

1. A projection display unit comprising:
    a light source;
    an optical unit including a light valve and a projection lens;
    an operating part including one or more of a power switch button, an input signal changeover button, an auto-focus changeover button, a tilt adjustment button, a zoom adjustment button, and a focus button;
    a terminal part including one or more of a power cord connection terminal and a picture signal input terminal;
    a cooling fan for cooling the light source and the optical unit; and
    a cabinet for housing the light source, the optical unit, the operating part, the terminal part, and the cooling fan, the cabinet comprising:
        a base cabinet on which the light source, the optical unit, and the cooling fan are mounted, the base cabinet having a front side with an opening for the projection lens;
        a first side face in which the operating part and terminal part are disposed;
        a second side face, which is opposite the first side face, and in which an exhaust port is provided for discharging heat from the cooling fan; and
        a top cover mounted to cover the base cabinet, the top cover having a rear face portion on the opposite side of the opening for the projection lens;
        wherein the rear face portion is formed in the shape of a laid-down U-shaped curved surface, and the distance between the top cover and the base cabinet is 50 mm or less.

2. The projection display unit as set forth in claim 1, wherein the top cover is formed from a sheet metal of an aluminum alloy.

3. The projection display unit as set forth in claim 1, wherein the rear face portion of the top cover is formed in a circular arc shape having a radius of about one half of the thickness of the cabinet and in the shape of a continuous curve.

4. The projection display unit as set forth in claim 1, wherein no operating part or terminal part is disposed at the rear face portion of the top cover.

5. The projection display unit as set forth in claim 4, wherein no operating part or terminal part is disposed on the top cover of the cabinet or the second side face of the cabinet.

6. The projection display unit as set forth in claim 4, wherein a transparent protective plate is provided on the front side of the projection lens such that it is flush with a front panel.

7. The projection display unit of claim 1, wherein the cabinet further comprises:
    a resin-made boss projectingly provided on an inside surface of the top cover; and
    a screw fastened to the boss from a base cabinet side to thereby fix the base cabinet and the top cover.

8. The projection display unit as set forth in claim 7, wherein the boss is molded integrally with the top cover by outsert molding.

9. The projection display unit as set forth in claim 7, wherein the boss is provided at a base end portion with a pedestal part for enlarging the area of interface with the top cover.

* * * * *